June 21, 1966  U. R. CARPENTIER  3,257,045
DUST TRAP AND VALVE THEREFOR
Filed Nov. 3, 1964  3 Sheets-Sheet 2

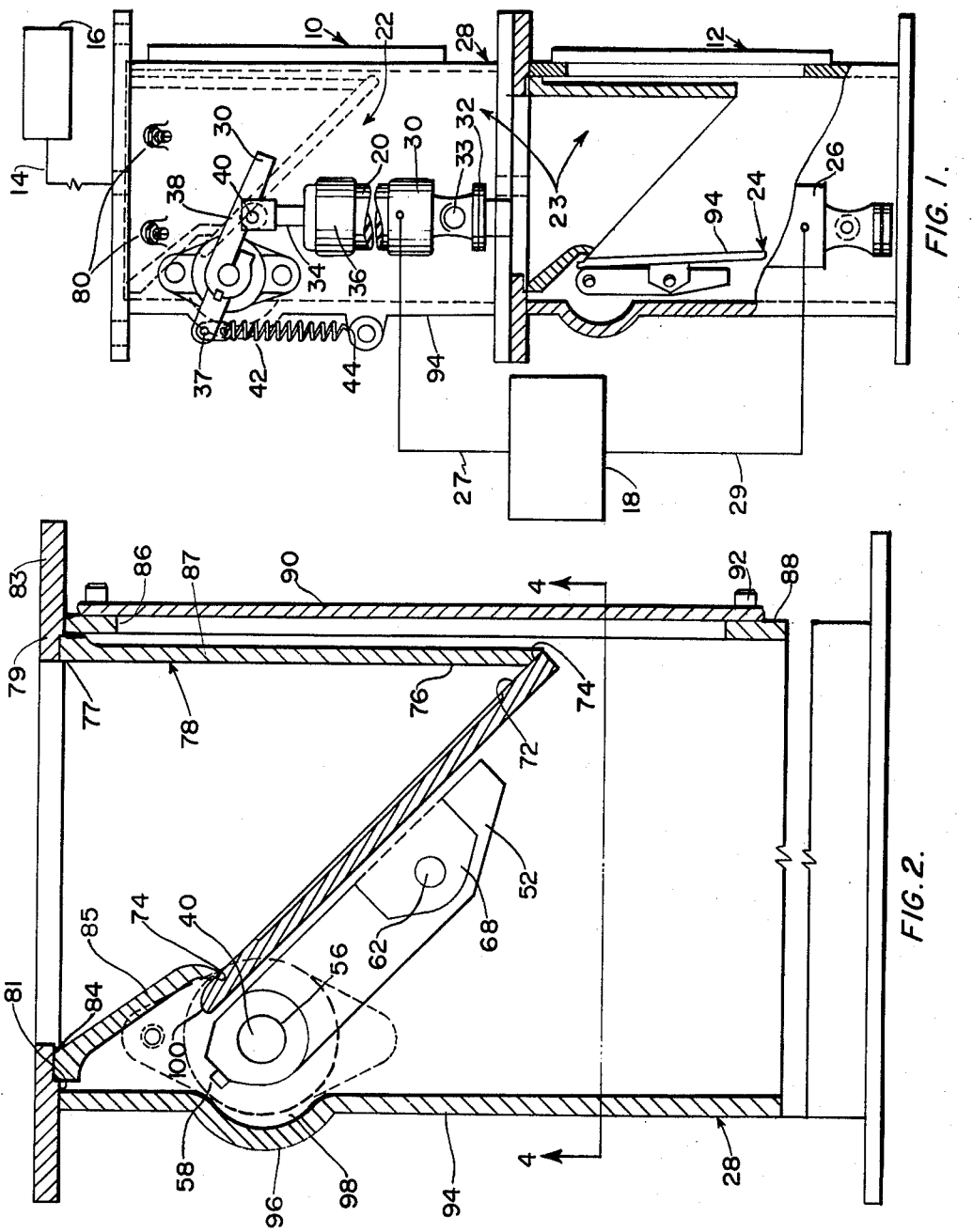

INVENTOR
URGEL RAMUAL CARPENTIER
BY
ATTORNEY

INVENTOR
URGEL RAMUAL CARPENTIER

United States Patent Office 3,257,045
Patented June 21, 1966

3,257,045
DUST TRAP AND VALVE THEREFOR
Urgel Ramual Carpentier, 3 Bailey Ave.,
Plattsburgh, N.Y.
Filed Nov. 3, 1964, Ser. No. 408,619
13 Claims. (Cl. 222—450)

The present invention relates to a dust trap and valve and more specifically to an improved dust valve which permits the inspection, cleaning and/or replacement of its wearing parts without the necessity of disconnecting or removing the entire trap unit from its working position or completely disassembling the dust trap unit itself.

Basically, dust traps are well known and have been used for years in conjunction with dust collection systems installed in, for example, iron ore sintering plants and pelletizing plants. Such dust collection systems are maintained under vacuum and the dust traps are utilized to permit the free dumping of the dust collected in the systems without exposing the vacuum in the system to atmosphere. Normally, a pair of dust valves are installed in a conduit together and are operated by cycling the opening and closing of the valves such that the gate of the first valve is opened and drops the material to be dumped into the chamber between that gate and the gate of the second valve. The gate of the first valve then closes, the gate of the second valve opens and the material falls free. At no time during the removal process are the gates of both valves open and thus, the atmosphere is not permitted to enter the conduit above the valves or the collection system.

However, as may be expected, the dusty environment in which these valves are utilized causes the rapid wearing of the valve seat and valve flap. Since satisfactory engagement and alignment must be maintained between the valve seat and valve flap at all times in order to preserve the vacuum in the dust collection system, frequent inspection and cleaning of the valves is required. Moreover, in view of the excessive wear, the valve seat and valve flap must periodically be removed from the valve and be reground or replaced.

Prior to the dust trap and valve of this invention, such inspection, cleaning and replacement of the valve seat and valve flap required that the entire trap unit be removed from condiut in which the unit was installed and that the unit be completely disassembled. Moreover, in some dust traps currently on the market, the valve seat is cast integrally with the trap body and this makes the inspection and cleaning of the valve seat difficult, besides the fact that, when the seat is worn, the entire unit must be scrapped. While it is readily apparent that the above-described inspection and maintenance procedure is time consuming and expensive, it was the long-standing industry practice; in fact, prior to this invention, it was the only inspection and maintenance procedure, which permitted satisfactory dust valve operation and guaranteed adequate dust valve life.

Even though the industry long recognized this problem, the trap and valve of this invention is the first dust valve to permit inspection, cleaning and replacement of the valve seat and valve flap without the necessity of first removing the entire unit from the conduit and completely disassembling it. In particular, the valve seat and valve flap and in fact, the whole interior of the improved dust trap of this invention are clearly visible through an access opening in one side of the trap body. This access opening permits easy and simplified inspection and cleaning of the valve seat and valve flap. Moreover, the valve seat and valve flap are designed and arranged so that they can be easily disconnected from the trap body and removed therefrom through the access opening. This unique access opening is normally closed and sealed by a cover plate which is secured to the trap body by conventional fastening means.

Thus, it will be appreciated that the dust trap and valve of this invention permits the inspection, cleaning and replacement of the valve seat and valve flap by the simple expedient of removing the access opening cover plate, and it completely obviates the necessity of removing the trap and valve unit from the conduit and disassembling it prior to performing such inspection, cleaning or replacement. Moreover, the simplified design and arrangement of the dust valve of this invention permits the components of the valve to be manufactured so that they can be used interchangeably from one unit to another. Appreciable savings are achieved because of the resultant ability to mass produce the components and because of the reduction of the inventory that must be stocked.

Another attribute of this invention is that the improved trap unit of this invention substantially eliminates troublesome problems in handling pellets or other like particles which are likely to jam the valve operating mechanism within the trap. Not only does the present trap have an access opening providing quick and easy ingress to the interior of the trap unit to remove the jammed objects, but the dust trap unit has a unique design which itself prevents jamming by the pellets bouncing out of the normal flow path into the valve operating mechanism.

It should be further noted that the above-mentioned features of the dust trap and valve of this invention provide real advantages which have been recognized by industry as demonstrated by the fact that, in a short time, this dust trap has already met with good trade acceptance in an industrial market; this is particularly significant considering that the valve industry is crowded and competitive and purchasers are usually technically skilled.

It is accordingly an object of the present invention to provide an improved dust trap.

It is another object of the present invention to provide a novel improved dust trap having an access opening in the side of the trap body for inspection, cleaning and replacing the valve seat and valve flap without first removing the valve unit from the conduit and disassembling it. A further object is to provide a novel improved arrangement and design of the valve seat and valve flap which permits them to be easily removed from the trap body through an access opening formed in the side of the trap body. This novel dust trap eliminates costly and time consuming maintenance and in fact, allows even relatively unskilled maintenance men to service the trap satisfactorily.

A still further object of the present invention resides in the manner in which the valve seat is supported within the trap body. Another related object resides in the manner and mechanism by which the valve flap is actuated.

Another object resides in the fact that each novel dust trap of the present invention is a complete unit with its own actuating mechanism. The trap units can be used interchangeably and this, of course, naturally reduces the number of the replacement parts, valve flaps and valve seats, which must be inventoried.

A further object of the present invention resides in the advantageous manner in which the valve seat and the valve flap are arranged in the trap body. A related object resides in design of the trap body to prevent the jamming of the valve operating mechanism within the valve by pellets or like objects.

A still further object of the present invention resides in the utilization of the novel dust trap in conjunction with a dust collection system maintained under vacuum.

These and other objects and advantages of the present invention will become apparent upon reference to the following specification and claims and appended drawings wherein:

FIGURE 1 is a side elevation and partly schematic view showing a dust collection system incorporating a dust trap, which includes a pair of dust valves of the present invention.

FIGURE 2 is a side elevation, partially in vertical section, showing the dust valve of the present invention.

Figure 4:
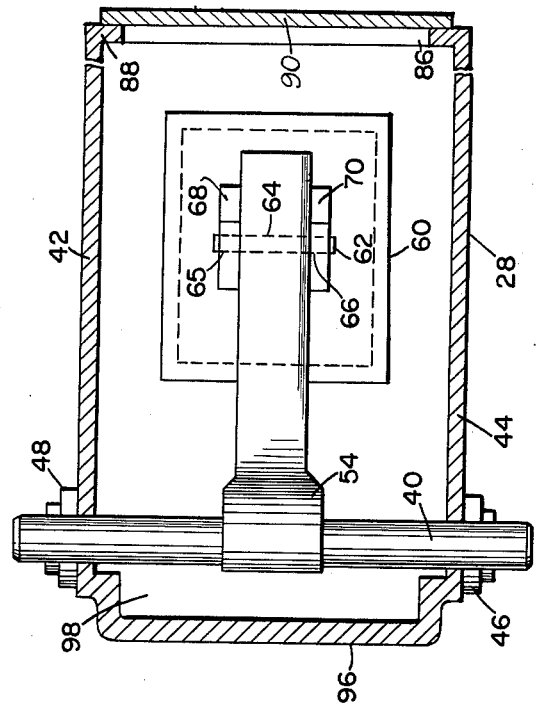
FIGURE 4 is a horizontal section on the line 4—4 of FIGURE 2.

Referring now to FIGURE 1, pair of valves 10 and 12 of the present invention are shown connected in series at one end of a conduit 14 (shown schematically). The other end of the conduit 14 is connected to a dust collection system, shown schematically at 16. Such a system 16 may be installed in pelletizing plants, sintering plants, quarries, stone crushing plants, plants producing abrasive materials for industry, gold, silver and copper collection systems, in grain elevators, and other similar applications.

As heretofore mentioned, the purpose of the valves 10 and 12 is to permit the free dumping of the dust, under vacuum in the system 16, to the atmosphere through the conduit 14 without exposing the vacuum in the system 16 to atmosphere.

This free dumping of the dust is accomplished by regulating the controller 18 (as shown schematically) so that it causes the pneumatic motor 20 to open the gate 22 of the valve 10, thus dropping the dust to be dumped into the space 23 between the gate 22 and the gate 24 of valve 12. The controller 18 then causes the gate 22 to close thereby trapping the dust to be dumped between the gates 22 and 24. Thereafter the controller 18 causes the pneumatic motor 26 to open the gate 24 and thereby dump the dust trapped between the gates 22 and 24 to the atmosphere.

Figure 5:
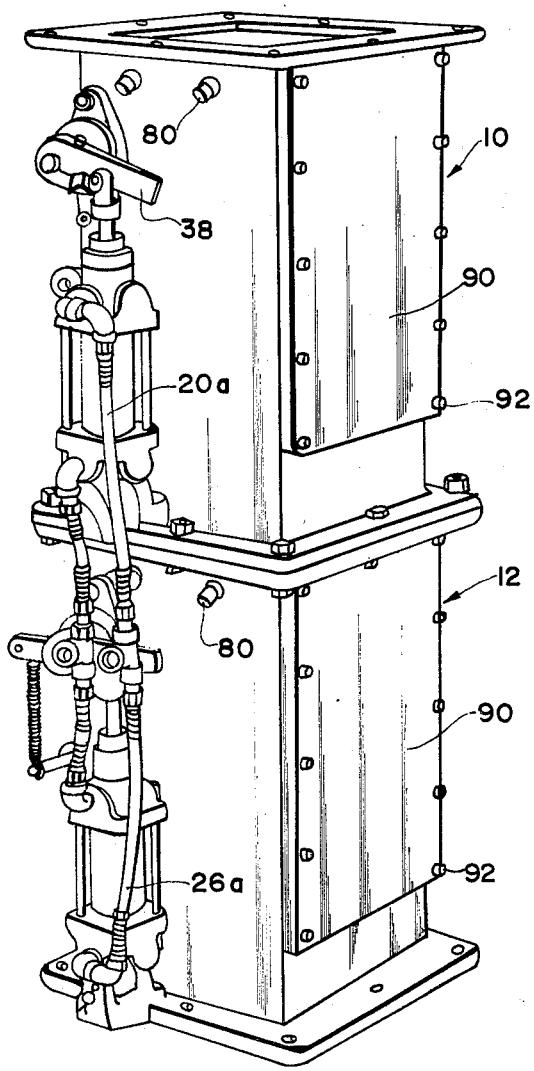
FIGURE 5 is a perspective view of a dust trap, which includes a pair of dust valves of the present invention.

The controller 18 is of conventional design and does not itself form a part of the present invention. The controller 18 is connected with the motors 20 and 26 by air lines diagrammatically at 27 and 29, and is also connected with a suitable source of air pressure, not shown. It, of course, should be apparent that while motors 20 and 26 are shown as single action pneumatic motors, they could be replaced by double action motors or by hydraulic or electric motors; or, both of the motors 20 and 26 could be replaced by a single motor and suitable linkage. For example, FIGURE 5 shows a pair of dust valves actuated by double acting motors 20a and 26a. The use of motors 20a and 26a causes positive closing of the dust valves and this aids in maintaining the vacuum in the system 16. In the particular arrangement shown in FIGURE 5, the opposite ends of the motors (viz., the rod end of one motor and the piston end of the other motor) are connected to a common air line from controller 18a (not shown). Also to delay the opening of one dust valve until the other dust valve is completely closed, thereby insuring that only one dust valve will be open at any given time, conventional metering valves (not shown) may be installed adjacent to the ends of each motor which, when pressurized, causes the valve to open.

Since the valves 10 and 12 are identical and in fact are used interchangeably in practice, only the valve 10 will be hereinafter described in detail.

Referring again to FIGURE 1, the motor 20 is mounted at its lower end 30 to the trap body 28 by means of a bracket 32 and pin 33. This connection between the bracket 32 and the motor 20 permits the motor to pivot slightly about the bracket 32. A piston rod 34 extends from the upper end 36 of the motor 20 and the upper end of rod 34 is attached to one end 30 of a lever 38, which in turn is connected near its center to the shaft 40. As shown in FIGURE 1, the other end 37 of lever 38 is biased in a counterclockwise direction by the governor spring 42, the opposite end of which is attached to the trap body 28 by the bracket 44. Of course, if double acting motors are utilized (such as shown in FIGURE 5) then such a governor spring may be omitted.

Figure 3:
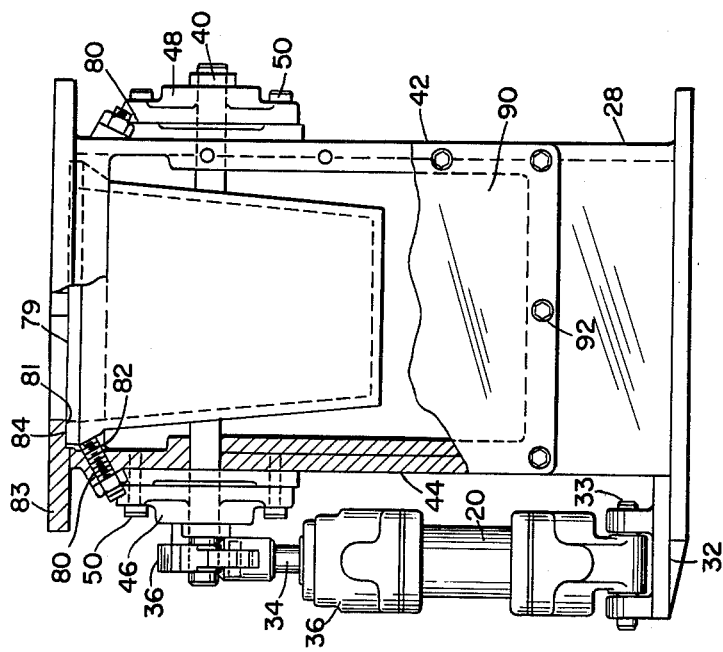
FIGURE 3 is a front elevation, partially in vertical section, showing the dust valve of the present invention.

Referring now also to FIGURES 2-4, it can be seen that the shaft 40 extends through both sides 42 and 44 of the trap body 28 and is journaled in the hinge bearings 46 and 48 which are attached to the sides 42 and 44 by means of screws 50.

An actuating arm 52 is attached at its one end 54 to the shaft 40 midway between the sides 42 and 44, by means of a key 56 and a screw 58.

The valve flap 60 is attached to the arm 52 by means of a wrist pin 62 which passes through hole 64 in arm 52 and aligned holes 65 and 66 in flanges 68 and 70 on the back of the flap 60, as shown in FIGURE 4.

The outer periphery of the front face 72 of the flap 60 is arranged to engage the valve seat 74 which is formed on the lower end 76 of the valve seat member or conduit 78. Both the valve flap 60 and seat 74 are preferably made of an abrasion and heat resistant alloy, such as Ni hard metal which gives long wear.

At its upper end 77, the member 78 is supported within the trap body 28 by means of set screws 80 which can be adjusted from outside of the valve body 28 to bear against the inclined cam surface 82 formed on the member 78, so as to provide support for the member 78 and also to urge the upper surface 79 of member 78 to bear against the lower surface 81 of the flange 83 suitably formed on the upper end of the trap body 28 so as to form a seal between these surfaces. To aid in correctly aligning member 78 within trap body 28, the surface 81 has a pocket or recess 84 formed therein for receiving the upper end 77 of valve member 78.

Side 85 of valve member 78 is shorter than side 87, and slopes downwardly and inwardly, as viewed in FIGURES 1 and 2, from its upper end 77, whereby the valve seat 74 is sloped in the same direction. However, it should be noted that the cross-sectional area (taken parallel to the seat 74) of the member 78 at lower end 76 is approximately equal to the cross-sectional area of the member 78 at its upper end 77 and thus the maximum flow path is maintained through the entire valve unit. Also, while the central axis of the flow paths through the members 78 and the body 28 are of course, not exactly coaxial, they are, for all intents and purposes, substantially coaxial.

The trap body 28 has an access opening 86 in its side 88. This opening 86 extends from just below where the set screws 80 extend through the sides and 42 and 44 to substantially below the lower end 76 of the member 78. Moreover, the opening 86 is substantially wider than the maximum width of the flap 60 and the member 78. A plate 90 is adapted to cover the opening 86 and is secured to the side 88 by means of a plurality of screws 92 or other suitable fastening means.

Of course, since the valves 10 and 12 are designed to maintain a high vacuum within the system 16, sealing gaskets must be placed between the various components of the valves. For example gaskets are placed between the plate 90 and the side 88, and between the surface 79 of member 78 and surface 81 of flange 83. Moreover, the ends of shaft 40 are sealed within the bearings 46 and 48.

As seen in FIGURES 2-4, the back wall 94 of the trap body 28 has a curved protuberance 96 adjacent to the point where end 54 of the actuating arm 52 is attached to the shaft 40. Of course, if desired, the protuberance 96 could be made to extend across the entire back wall 94. The space 98 thus formed between the shaft 40 and end 54 and the wall 94 creates a bypass through which any pellets or like objects which happen to have bounced or otherwise gotten between the walls 85 and 94 can return to the main part of the valve. In addition, the rear end 100 of the valve flap 60 is extended upwardly so that when valve flap 60 is open, there is a minimum of space between the end 100 and the valve seat wall 85 through which pellets can pass (e.g. due to ricocheting or back up). The distance between the inner edge of the protuberance 96 and the shaft 40 and end 54 of flap valve arm 52 is preferably at least three times the diameter (or like major dimension) of the largest pellets or particles to be handled by the valve.

This construction of the rear wall 94 and the valve flap 60 and related parts has substantially eliminated the troublesome problem of pellets and like particles jamming the valve operating mechanism.

As shown in FIGURE 4, the trap body 28 has a substantially square cross-sectional shape and the flap 60 and member 78 has substantially rectangular cross-sectional shapes. However, it should be apparent that the cross-sectional shapes of these members may take other suitable geometric forms consistent with this invention. Likewise, though the shape of the access opening 86 is shown as being rectangular, the shape could be changed and the size can be increased or decreased so long as the opening permits the inspection, cleaning and replacement of the valve seat and flap consistent with this invention.

Operation

Referring now to the operation of valve 10, as shown in FIGURES 1–4, when the motor 20 is actuated by the controller 18 to close the valve, the rod 34 is extended upward thus rotating the lever 38 and the shaft 40 (counterclockwise in FIGURES 1 and 2) and the arm 52 carries flap 60 with it. The motor has sufficient force to close the flap 60 quickly with a "slapping" action thereby preventing the valve from plugging and maintaining a clean valve seat and opening area. However, when the valve flap 60 engages the seat 74, the motor 20 is overridden and further extension of the rod 34 is prevented.

It is noted that both motors 20 and 26 have been provided with extra length of stroke and thus adjustment for wear between the valve flaps and the valve seats is automatically compensated for by these motors without the need of an adjustment of any kind.

When the controller 18 causes the rod 34 to be retracted, the lever 38 and shaft 40, and thus, the arm 52 and flap 60, are rotated in opposite direction (clockwise in FIGURE 1) until the arm 52 and flap 60 assume the position in which the flap 94 of valve 12 is shown in FIGURE 1.

Now if it is desired to inspect and clean the interior of the valve 10 or to replace the seat member 78 and/or the flap 60 after the valve 10 has been installed in the conduit 14, a simple and time saving procedure is followed.

First the access opening plate 90 is removed by unscrewing the screws 92 thus fully exposing for inspection the complete interior of the valve 10, including both the valve member 78 and the valve flap 60. However, if closer inspection or more thorough cleaning or replacement of such valve components is desired, the set screws are loosened from outside the valve body 28 and the member 78 is dropped and removed through the side opening 86. Next the maintenance man may easily reach through the opening 86 and remove the wrist pin 62 connecting the flap 60 and the arm 52 so that the valve flap 60 can also be easily removed through the opening 86.

After cleaning, regrinding and/or replacement of the valve member 78 and valve flap 60, these components can be reinstalled in the body 28 by reversing the above-described process, e.g., the flap 60 is positioned in the valve body 28 and the actuating arm 52 and the flap 60 are again connected by the wrist pin 62; the member 78 is placed in the valve body 28, and held so that its upper end 77 is aligned within recess 84; and the set screws 80 are tightened against the surface 82 thereby bringing the upper surface 79 and the lower surface 81 into sealing engagement. The plate 90 is then replaced and secured by screws 92.

Thus, by this simple procedure, the wearing parts of the dust can be inspected, cleaned and/or replaced without removing the entire valve from the system and conduit, and dismantling it as heretofore has been necessary. Furthermore, any foreign materials in the dust valve can also be easily removed through the access opening 86. Also, multiple dust valves 10 can be kept in continuous service by merely inventorying a minimal number of valve flaps 60 and valve member 78.

The novel design and arrangement of the components of the dust valve of this invention do not only provide an extremely efficient and durable dust valve, but also have solved a major problem in industries needing dust valves. The problems solved were long-standing ones which skilled persons in the industry have heretofore been unable to solve, even though the dust valve industry is active and competitive. Moreover, even after the development of the dust valve of this invention, it was not until after demonstrations in actual installations that industry users were satisfied that the dust valve of this invention had satisfactorily solved these problems and long existing needs.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A valve comprising a valve body having a flow path therethrough from one end to the other, a conduit member removably mounted in said valve body and forming a valve seat, the flow path through said conduit member being substantially coaxial with the flow path through the adjacent portion of said valve body, said conduit member having a short side and an opposite long side terminating at said valve seat, a valve actuator shaft passing through said valve body adjacent said short side of said conduit member, and a valve flap removably coupled to said valve actuator shaft for moving into and out of engagement with said valve seat, said valve body having an access opening adjacent said long side of said conduit member for removal of said conduit member and said valve flap from inside said valve body.

2. A valve according to claim 1 including means projecting to the outside of said valve body for removably securing said conduit member to said valve body.

3. A dust valve comprising a cylindrical valve body having a flow path therethrough from one end to the other, a conduit member removably mounted in said valve body, said conduit member having a flow path therethrough substantially concentric with the flow path through the adjacent portion of said valve body, said conduit member having a short side and a diametrically opposite long side terminating at one end of said conduit member in a valve seat, a valve actuator shaft passing through said valve body adjacent said short side of said conduit member in a direction transverse to said flow paths, a removable valve flap carried by said actuator shaft for movement into and out of engagement with said valve seat, said valve body having an access opening adjacent said long side of said conduit member for removal of said conduit member and said valve flap from inside said valve body, and a removable cover secured to said body over said access opening.

4. A dust valve according to claim 3 wherein said cylindrical valve body is of rectangular cross section.

5. A dust valve according to claim 3 wherein said actuator shaft carries an actuating arm, and wrist pin means removably coupling said valve flap to said actuating arm.

6. A dust valve comprising a valve body having a flow path therethrough from one end to the other, a tubular conduit member in said valve body having a flow path therethrough substantially coaxial with the flow path through the adjacent portion of said valve body, one end of said conduit member defining a valve seat in said body, said conduit member having a short side and an opposite long side defining a valve seat lying in a plane forming an acute angle with the flow path through said conduit member, a valve actuator shaft passing through said valve body adjacent said short side of said conduit member in a direction transverse to said flow paths, said valve body having an access opening adjacent said long side of said conduit member for removal of said conduit member and said valve flap from inside said body, cam means on said conduit member, and means cooperating with said cam means and accessible from outside said valve body for releasably securing said conduit member to said valve body.

7. A dust valve according to claim 6 wherein the end of said short side of said conduit member adjacent said valve seat is spaced from the inner wall of said valve body to provide clearance for said actuator shaft.

8. A dust valve according to claim 7 wherein said short side of said conduit member tapers inwardly from said valve body in the direction of said valve seat to provide clearance for said actuator shaft.

9. A dust valve comprising a valve body of rectangular cross section having a flow path therethrough from one end to the other, a conduit member of rectangular cross section removably mounted in said valve body having a flow path therethrough substantially coaxial with the flow path through the adjacent portion of said valve body, one end of said conduit member defining a valve seat in said body, said conduit member having a short side and an opposite long side whereby said valve seat lies in a plane forming an acute angle with said flow paths, a valve actuator shaft passing through said valve body adjacent said short side of said conduit member in a direction transverse to said flow paths, a valve actuating arm carried by said valve actuator shaft, a valve flap removably mounted on said actuating arm for movement into and out of engagement with said valve seat, said valve body having an access opening adjacent said long side of said conduit member for removal of said conduit member and said valve flap from inside said valve body, a removable cover over said access opening, and drive means mounted on said body and coupled to said actuator shaft for opening and closing said valve.

10. A dust valve according to claim 9 including a cam surface formed on the other end of said conduit member, and a plurality of screws passing through said valve body and engaging said cam surface to removably secure said conduit member to said valve body.

11. A dust valve according to claim 9 wherein said short side of said conduit member includes a portion spaced inwardly from said valve body to provide rotational clearance for said valve flap.

12. A dust trap comprising a trap body having a flow path therethrough from one end to the other, and a pair of spaced flapper valves in said trap body, each of said flapper valves comprising a conduit member removably mounted in said valve body and forming a valve seat, the flow path through said conduit member being substantially coaxial with the flow path through the adjacent portion of said trap body, said conduit member having a short side and an opposite long side terminating at said valve seat, a valve actuator shaft passing through said trap body adjacent said short side of said conduit member, and a valve flap removably coupled to said valve actuator shaft for moving into and out of engagement with said valve seat, said trap body having an access opening adjacent said long side of said conduit member for removal of said conduit member and said valve flap from inside said trap body.

13. A dust trap comprising a trap body of rectangular cross section having a flow path therethrough from one end to the other, and a pair of spaced flapper valves in said trap body, each of said flapper valves comprising a conduit member of rectangular cross section removably mounted in said valve body having a flow path therethrough substantially coaxial with the flow path through the adjacent portion of said trap body, one end of said conduit member defining a valve seat in said body, said conduit member having a short side and an opposite long side whereby said valve seat lies in a plane forming an acute angle with said flow paths, a valve actuator shaft passing through said trap body adjacent said short side of said conduit member in a direction transverse to said flow paths, a valve actuating arm carried by said valve actuator shaft, a valve flap removably mounted on said actuating arm for movement into and out of engagement with said valve seat, said trap body having an access opening adjacent said long side of said conduit member for removal of said conduit member and said valve flap from inside said valve body, a removable cover over said access opening, and drive means mounted on said body and coupled to the actuator shaft of each of said flapper valves for opening and closing said flapper valves in sequence whereby one of said flapper valves is open when the other is closed.

References Cited by the Examiner

UNITED STATES PATENTS

| 195,137 | 9/1877 | LaBaw | 251—362 |
| 290,314 | 12/1883 | Blessing | 251—362 X |
| 1,414,870 | 5/1922 | Fisher | 222—504 X |
| 2,611,465 | 9/1952 | Simon | 222—450 X |
| 2,856,961 | 9/1958 | Kruschik | 251—362 X |
| 3,106,380 | 10/1963 | Gerber | 251—362 |
| 3,131,719 | 5/1964 | Englert et al. | 251—362 X |

References Cited by the Applicant

UNITED STATES PATENTS

| 298,865 | 5/1884 | Lang. |
| 326,549 | 9/1885 | D'Este. |
| 1,668,456 | 5/1928 | Jennings. |
| 2,247,773 | 7/1941 | Dunn. |
| 2,578,076 | 12/1951 | Kirby. |
| 2,664,264 | 12/1953 | Fennema. |
| 2,750,955 | 6/1956 | Bredtscheider et al. |
| 2,841,360 | 7/1958 | Gustavsson et al. |
| 2,902,254 | 9/1959 | Conway et al. |

LOUIS J. DEMBO, *Primary Examiner.*

HADD S. LANE, *Examiner.*